(12) United States Patent
Shin

(10) Patent No.: US 11,882,209 B2
(45) Date of Patent: Jan. 23, 2024

(54) CONTROLLER AND ELECTRONIC SYSTEM HAVING THE SAME

(71) Applicant: SK hynix Inc., Gyeonggi-do (KR)

(72) Inventor: Hee Chan Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 352 days.

(21) Appl. No.: 17/209,927

(22) Filed: Mar. 23, 2021

(65) Prior Publication Data

US 2022/0103352 A1 Mar. 31, 2022

(30) Foreign Application Priority Data

Sep. 25, 2020 (KR) .......................... 10-2020-0125015

(51) Int. Cl.
*H04L 9/08* (2006.01)
*H04L 29/08* (2006.01)
*H04L 67/1097* (2022.01)

(52) U.S. Cl.
CPC .......... *H04L 9/0825* (2013.01); *H04L 9/0861* (2013.01); *H04L 9/0894* (2013.01); *H04L 67/1097* (2013.01)

(58) Field of Classification Search
CPC ... H04L 9/0825; H04L 9/0861; H04L 9/0894; H04L 67/1097
USPC ........................................................ 713/161
See application file for complete search history.

(56) References Cited

U.S. PATENT DOCUMENTS

| | | | |
|---|---|---|---|
| 10,558,589 B1* | 2/2020 | de Cesare | G06F 21/78 |
| 2014/0068791 A1* | 3/2014 | Resch | G06F 21/10 |
| | | | 726/30 |
| 2016/0323103 A1* | 11/2016 | Baptist | G06F 11/1443 |
| 2019/0258581 A1 | 8/2019 | Lee | |

FOREIGN PATENT DOCUMENTS

| | | |
|---|---|---|
| KR | 10-2019-0133208 | 12/2019 |
| KR | 10-2107711 | 5/2020 |
| NL | 2011611 A | 4/2014 |

OTHER PUBLICATIONS

Office Action for the Chinese Patent Application No. 202110556204.3 issued by the Chinese Patent Office dated Aug. 14, 2023.

* cited by examiner

*Primary Examiner* — Kambiz Zand
*Assistant Examiner* — Phuc Pham
(74) *Attorney, Agent, or Firm* — IP & T GROUP LLP

(57) ABSTRACT

The present technology includes a controller and an electronic system including the same. The electronic system includes a memory device including a plurality of zones, each zone capable of storing data, a plurality of hosts configured to output access requests for accessing a selected zone, among the plurality of zones, and a controller configured to select one of the plurality of hosts according to order in which the access requests are received, generate and store a key for confirming the selected host, and transmit the key to the selected host, when the access requests to access the selected zone are received from the plurality of hosts, wherein the selected host transmits an operation request including the key to the controller, and the controller executes the operation request when the key is included in the operation request received from the selected host.

16 Claims, 18 Drawing Sheets

CONTROLLER AND ELECTRONIC SYSTEM HAVING THE SAME

CROSS-REFERENCE TO RELATED APPLICATION

The present application claims priority under 35 U.S.C. § 119(a) to Korean patent application number 10-2020-0125015, filed on Sep. 25, 2020, which is incorporated herein by reference in its entirety.

BACKGROUND

Field of Invention

The present disclosure relates to a controller and an electronic system including the same, and more particularly, to a controller that communicates between a host and a memory device and an electronic system including the controller.

Description of Related Art

An electronic system may include one or more hosts and a memory system.

A host may be a device such as a mobile phone or a computer, and the memory system may be a system that stores data or outputs read data under control of the host. The memory system may include a memory device in which data is stored and a controller that controls the memory device. The memory device is classified into a volatile memory device and a nonvolatile memory device.

The volatile memory device is a device that stores data only when power is supplied and loses the stored data when the power supply is cut off. The volatile memory device includes a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

SUMMARY

Embodiments of the present disclosure provide a controller capable of efficiently managing access of hosts when a plurality of hosts request access to the same memory area of a memory system, and an electronic system including the controller.

According to an embodiment of the present disclosure, an electronic system includes a memory device including a plurality of zones, each zone capable of storing data, a plurality of hosts configured to output access requests for accessing a selected zone, among the plurality of zones, and a controller configured to select one of the plurality of hosts according to order in which the access requests are received, generate and store a key for confirming the selected host, and transmit the key to the selected host, when the access requests to access the selected zone are received from the plurality of hosts, wherein the selected host transmits an operation request including the key to the controller, and the controller executes the operation request when the key is included in the operation request received from the selected host.

According to an embodiment of the present disclosure, a controller includes an access manager configured to select one host among a plurality of hosts according to order in which access requests are input, and output, to the selected host, a key for confirming the selected host when a plurality of access requests for accessing the same zone are received from the plurality of hosts, a key generator configured to store a plurality of keys and to output one of the plurality of keys as the key in response to a key generation signal, a key manager configured to transmit the key generation signal to the key generator and transmit the key output from the key generator to the access manager according to a request of the access manager, and a key comparator configured to check the key included in an operation request when the selected host outputs the operation request including the key.

According to an embodiment of the present disclosure, an electronic system includes a first host configured to output a first access request for accessing a first zone, a second host configured to output a second access request for accessing the first zone, an access manager configured to select the first host that outputs the first access request earlier than the second access request, and transmit a key for permitting access of the first host to the first host when the first and second access requests are input, a key generator configured to generate the key, a key buffer configured to store the key in a memory area corresponding to the first zone, a key manager configured to transmit, to the key generator, a request to generate the key, and transmit the key to the access manager and the key buffer when the key is received from the key generator, and a key comparator configured to determine whether to execute an operation request by comparing the key in the operation request with the key stored in the key buffer when the first host outputs the operation request including the key.

According to an embodiment of the present disclosure, a system includes a memory system including a memory device, which includes a plurality of zones, each zone capable of storing data, and a controller configured to control the memory device, and a plurality of hosts, each host configured to transmit, to the controller, an access request for a zone selected from among the plurality of zones, wherein the controller is configured to receive access requests from the plurality of hosts, select a host among the plurality of hosts based on the order of which the access requests are received, generate and store a key for the selected host, and transmit the key to the selected host, wherein the selected host receives the key from the controller, and transmits, to the controller, an operation request including the key, and wherein the controller receives the operation request including the key from the selected host, compares the received key with the stored key, and performs an operation on the selected zone associated with the operation request based on the comparison result.

The present technology may efficiently manage access of a plurality of hosts by using a key for identifying a host to which access is allowed.

DETAILED DESCRIPTION

Figure 1:
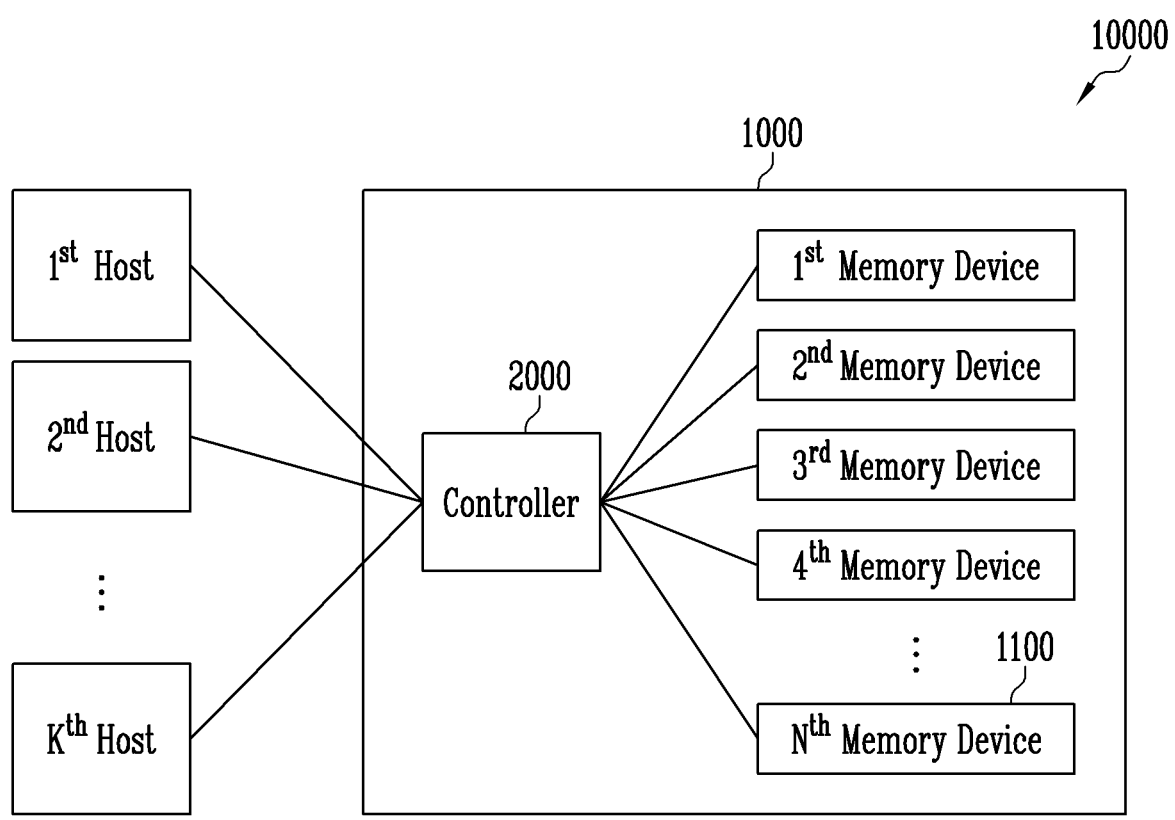
FIG. 1 is a diagram illustrating an electronic system according to an embodiment of the present disclosure.

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments.

The terminology used herein is for the purpose of describing particular embodiments only and is not intended to be limiting of the present invention.

It is noted that reference to "an embodiment," "another embodiment" or the like does not necessarily mean only one embodiment, and different references to any such phrase are not necessarily to the same embodiment(s).

Hereinafter, the various embodiments of the present invention will be described in detail with reference to the attached drawings.

FIG. 1 is a diagram illustrating an electronic system 10000 according to an embodiment of the present disclosure.

Referring to FIG. 1, the electronic system 10000 may include a plurality of hosts (e.g., first to Kth hosts, where K is a positive integer) configured to output various requests, and a memory system 1000 configured to store data or output data in response to the requests.

The memory system 1000 may include first to Nth memory devices 1100 (where N is a positive integer) in which the data is stored and a controller 2000 capable of controlling the first to Nth memory devices 1100.

The first to Nth memory devices 1100 may be configured identical or similar to each other, and may store the data or output the stored data according to control of the controller 2000.

The controller 2000 may communicate between the first to Kth hosts and the first to Nth memory devices 1100. For example, the controller 2000 may perform a program operation on a memory device selected among the first to Nth memory devices 1100 or may read the data from the selected memory device according to a request output from one of the first to Kth hosts.

When receiving a plurality of access requests from the first to Kth hosts, the controller 2000 may select one among the received requests according to an internal operation, and transmit a key to a host that outputs the selected request. Further, the controller 2000 may output a refuse signal indicating that the requests output by unselected hosts may not be performed to the unselected hosts. The selected host may include the key transmitted from the controller 2000 in an operation request, and output the operation request including the key to the controller 2000. The controller 2000 may receive the operation request output from the selected host, compare the key included in the operation request with a key stored therein, and execute the request of the selected host when the two keys are identical to each other.

Figure 2:
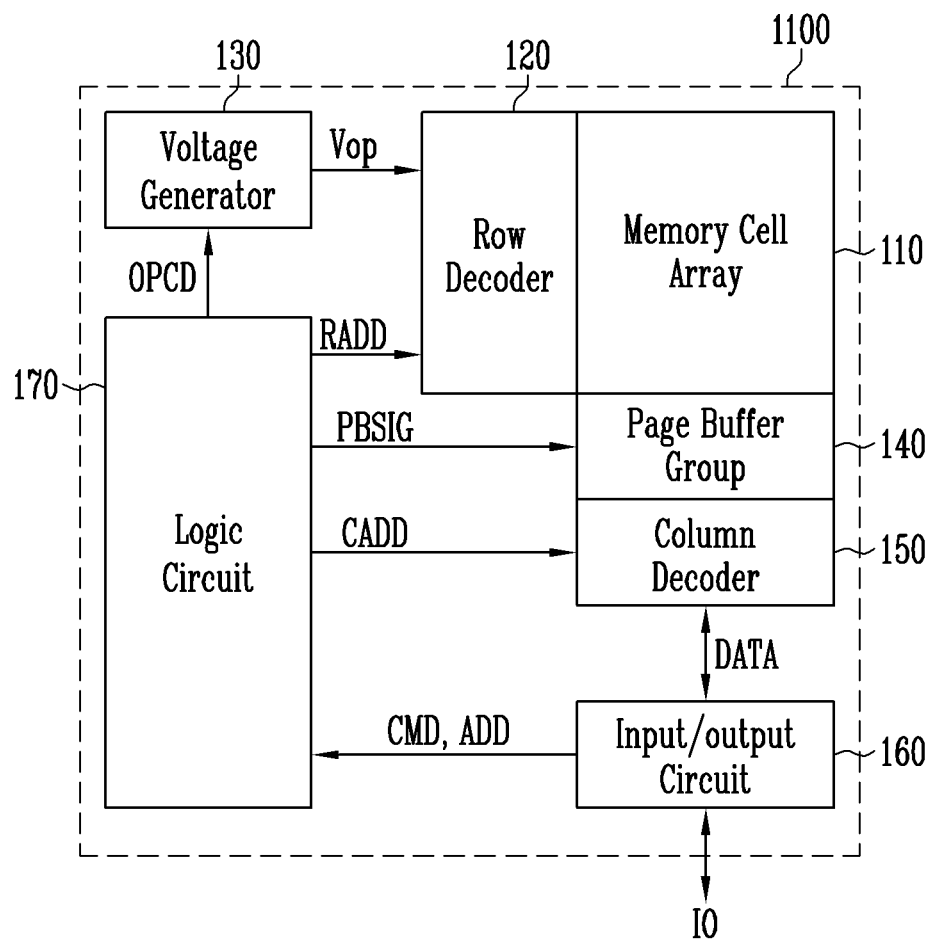
FIG. 2 is a diagram illustrating a memory device according to an embodiment of the present disclosure.

FIG. 2 is a diagram illustrating a memory device 1100 according to an embodiment of the present disclosure, and shows any one of the first to Nth memory devices 1100 shown in FIG. 1.

Referring to FIG. 2, the memory device 1100 may include a memory cell array 110 in which data is stored, and a peripheral circuit capable of performing a program, read, or erase operation on the memory cell array 110.

The memory cell array 110 may include a plurality of memory blocks in which data is stored. Each of the memory blocks may include a plurality of memory cells, and the memory cells may be implemented in a two-dimensional structure in which the memory cells are arranged in parallel to a substrate or a three-dimensional structure in which the memory cells are stacked in a vertical direction on the substrate.

The peripheral circuit may include a row decoder 120, a voltage generator 130, a page buffer group 140, a column decoder 150, an input and output (input/output) circuit 160, and a logic circuit 170.

The row decoder 120 may select one memory block among the memory blocks in the memory cell array 110 according to a row address RADD, and transmit operation voltages Vop to the selected memory block.

The voltage generator 130 may generate and output the operation voltages Vop required for various operations in response to an operation code OPCD. For example, the voltage generator 130 may generate and output a program voltage, a read voltage, an erase voltage, a pass voltage, a verify voltage, a negative voltage, and the like in response to the operation code OPCD.

The page buffer group 140 may be connected to the memory cell array 110 through bit lines. For example, the page buffer group 140 may include page buffers connected to the respective bit lines. The page buffers may operate simultaneously in response to page buffer control signals PBSIG, and may temporarily store data during the program or read operation. The verify operation performed during the program operation and the verify operation performed during the erase operation may be performed in a method similar to the read operation. During the read operation or the verify operation, the page buffers may sense a voltage of the bit lines, which vary according to a threshold voltage of the memory cells. That is, it may be determined whether the threshold voltages of the memory cells are less than or greater than the read voltage or the verify voltage according to a result of the sensing operation performed in the page buffers.

The column decoder 150 may transmit data DATA between the input/output circuit 160 and the page buffer group 140 according to a column address CADD.

The input/output circuit 160 may be connected to the controller 2000 of FIG. 1 through input/output lines IO. The input/output circuit 160 may input and output a command CMD, an address ADD, and data DATA through the input/output lines IO. For example, the input/output circuit 160 may transmit the command CMD and the address ADD received from the controller 2000 through the input/output lines IO to the logic circuit 170, and transmit the data DATA received from the controller 2000 through the input/output lines IO to the column decoder 150. The input/output circuit 160 may output the data DATA received from the column decoder 150 to the controller 2000 through the input/output lines IO.

The logic circuit 170 may output the operation code OPCD, the row address RADD, the page buffer control signals PBSIG, and the column address CADD in response to the command CMD and the address ADD. For example, the logic circuit 170 may include software that performs an algorithm in response to the command CMD, and hardware configured to output various signals according to the address ADD and the algorithm.

Figure 3:
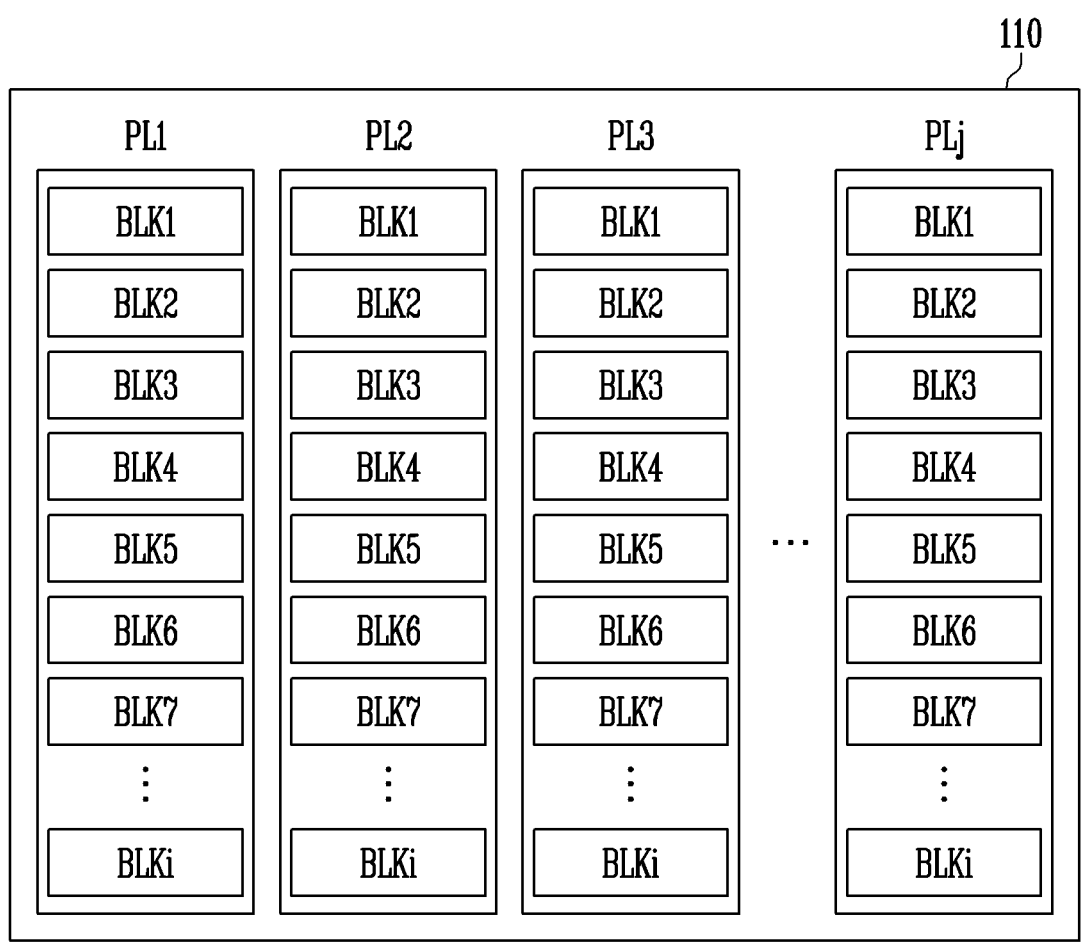
FIG. 3 is a diagram illustrating a memory cell array according to an embodiment of the present disclosure.

FIG. 3 is a diagram illustrating a memory cell array 110 according to an embodiment of the present disclosure.

Referring to FIG. 3, the memory cell array 110 may be configured as a single plane or a multi-plane. The single plane means a configuration in which only one plane is included in the memory cell array 110. A multi-plane means a configuration in which a plurality of planes are included in the memory cell array 110. By way of example, FIG. 3 shows the memory cell array 110 configured as the multi-plane. The planes may be defined as a memory area in which different row decoders and different page buffer groups are connected. For example, when the memory cell array 110 includes first to j-th planes PL1 to PLj (where j is a positive integer), each of the first to j-th planes PL1 to PLj may include first to i-th memory blocks BLK1 to BLKi (where i is a positive integer). The first to i-th memory blocks BLK1 to BLKi in different planes may be connected to different row decoders and different page buffer groups, whereas the first to i-th memory blocks BLK1 to BLKi in the same plane maybe connected to the same row decoder and the same page buffer group.

Figure 4:
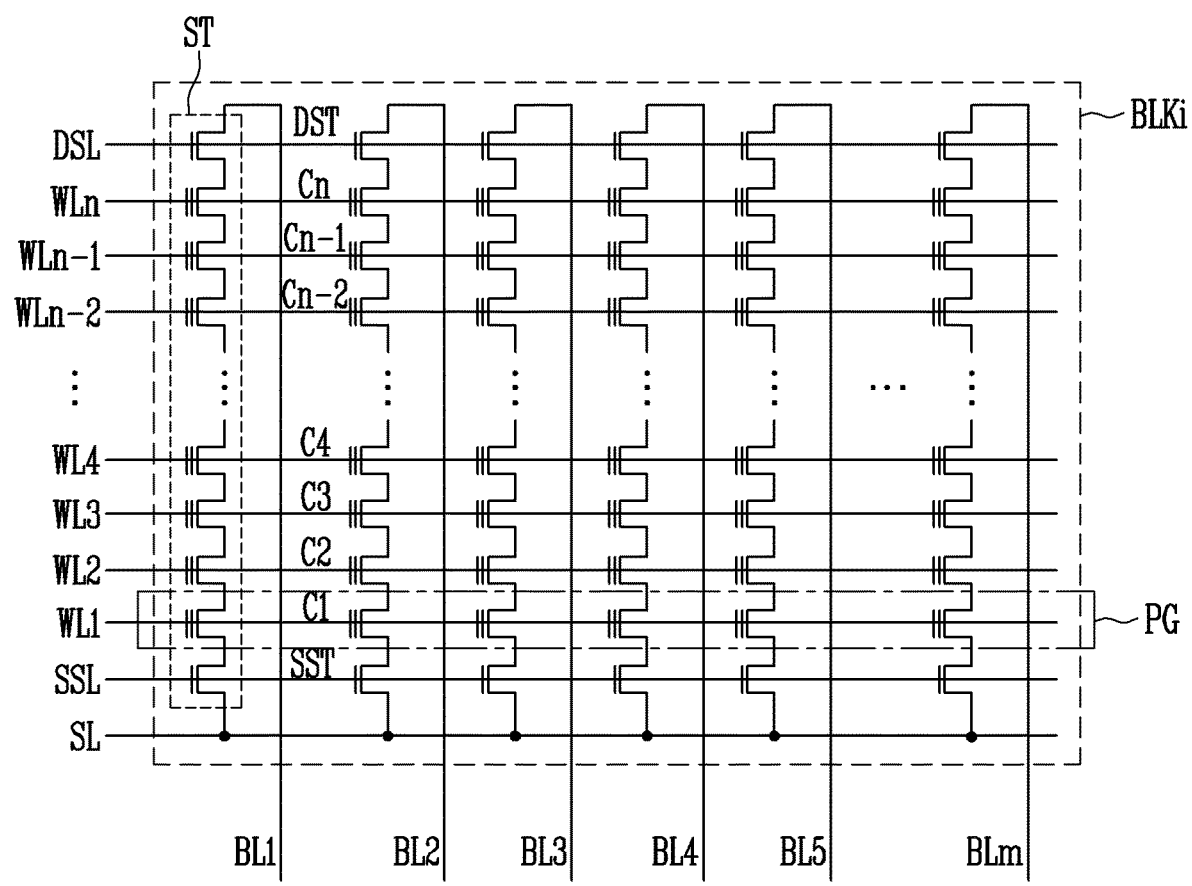
FIG. 4 is a diagram illustrating a memory block according to an embodiment of the present disclosure.

FIG. 4 is a diagram illustrating a memory block according to an embodiment of the present disclosure.

Referring to FIG. 4, any one memory block BLKi among the plurality of memory blocks BLK1 to BLKi shown in FIG. 3 is shown as an embodiment.

The memory block BLKi may include a plurality of strings ST connected between first to m-th bit lines BL1 to BLm (where m is a positive integer) and a source line SL. Each of the strings ST may include a source select transistor SST, and first to n-th memory cells C1 to Cn (where n is a positive integer), and a drain select transistor DST connected in series between the source line SL and the first to m-th bit lines BL1 to BLm.

Since FIG. 4 illustrates a configuration example of the memory block BLKi, the number of source select transistors SST, first to n-th memory cells C1 to Cn, and drain select transistors DST is not limited to the number shown in FIG. 4.

Gates of the source select transistors SST connected to different strings ST may be connected to a source select line SSL. The gates of each of the first to n-th memory cells C1 to Cn may be connected to first to n-th word lines WL1 to WLn. Gates of the drain select transistors DST may be connected to a drain select line DSL.

A group of memory cells connected to the same word line and included in different strings ST may configure one page PG. The program operation and the read operation may be performed in a page PG unit.

Figure 5:
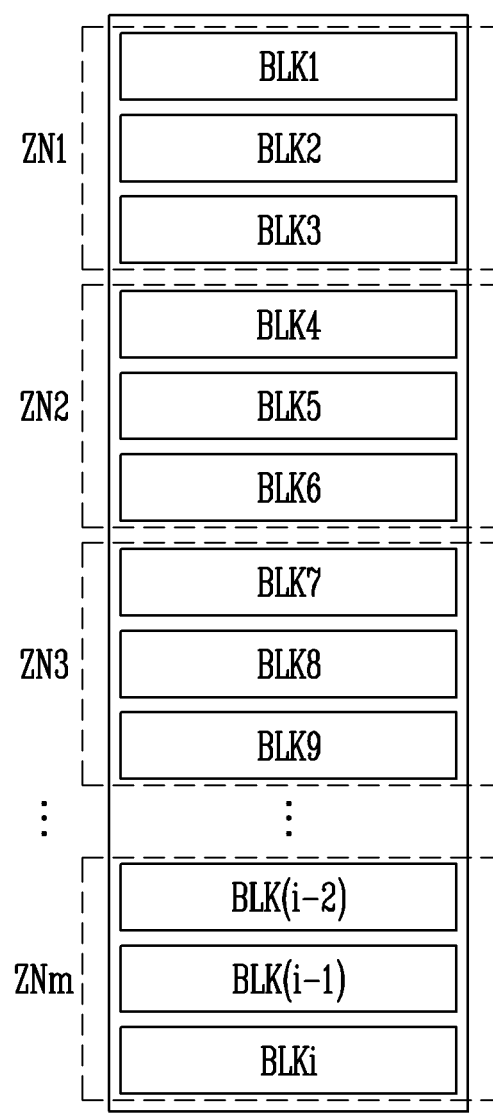
FIG. 5 is a diagram illustrating zones defined according to an embodiment of the present disclosure.

FIG. 5 is a diagram illustrating zones defined according to an embodiment of the present disclosure.

Referring to FIG. 5, a plane PLj may include the first to i-th memory blocks BLK1 to BLKi and may be divided into a plurality of zones. The zone refers to an area for efficiently managing a plurality of memory blocks as the number of memory blocks in the memory cell array is increased and a capacity of programmed data is increased. For example, when the first to i-th memory blocks BLK1 to BLKi are included in the j-th plane PLj, the first to i-th memory blocks BLK1 to BLKi may be divided into m (where m is a positive integer) zones. In the illustrated example, the first to third memory blocks BLK1 to BLK3 may be divided into a first zone ZN1, the fourth to sixth memory blocks BLK4 to BLK6 may be divided into a second zone ZN2, the seventh to ninth memory blocks BLK7 to BLK9 may be divided into a third zone ZN3, and the (i−2)-th to i-th memory blocks BLK(i−2) to BLKi may be divided into an m-th zone ZNm.

Figure 6:
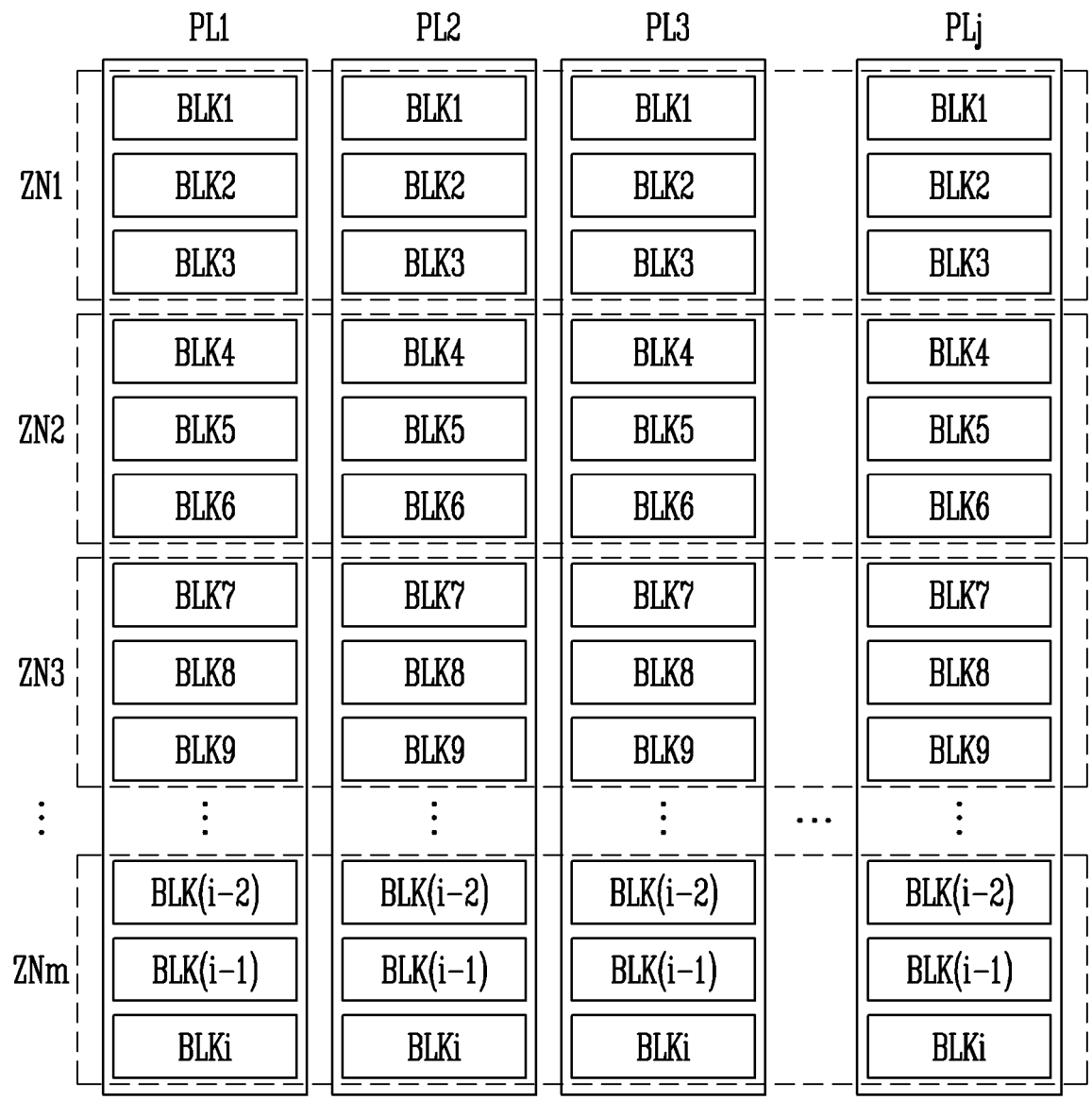
FIG. 6 is a diagram illustrating zones defined according to another embodiment of the present disclosure.

FIG. 6 is a diagram illustrating zones defined according to another embodiment of the present disclosure.

Referring to FIG. 6, the first to m-th zones ZN1 to ZNm may be divided in a unit of the memory blocks in the plurality of planes. For example, assuming that each of the first to j-th planes PL1 to PLj includes the first to i-th memory blocks BLK1 to BLKi, the first zone ZN1 may include the first to third memory blocks BLK1 to BLK3 in each of the first to j-th planes PL1 to PLj, the second zone ZN2 may include the fourth to sixth memory blocks BLK4 to BLK6 in each of the first to j-th planes PL1 to PLj, the third zone may include the seventh to ninth memory blocks BLK7 to BLK9 in each of the first to j-th planes PL1 to PLj, and the m-th zone ZNm may include the (i−2)-th to i-th memory blocks BLK(i−2) to BLKi in each of the first to j-th planes PL1 to PLj.

In the illustrated examples in FIGS. 5 and 6, a zone identifier (ID) may be assigned to each of the first to m-th zones ZN1 to ZNm, and memory blocks in the selected zone may be selected according to the zone ID. That is, the zone ID may be the address of the zone.

Figure 7:
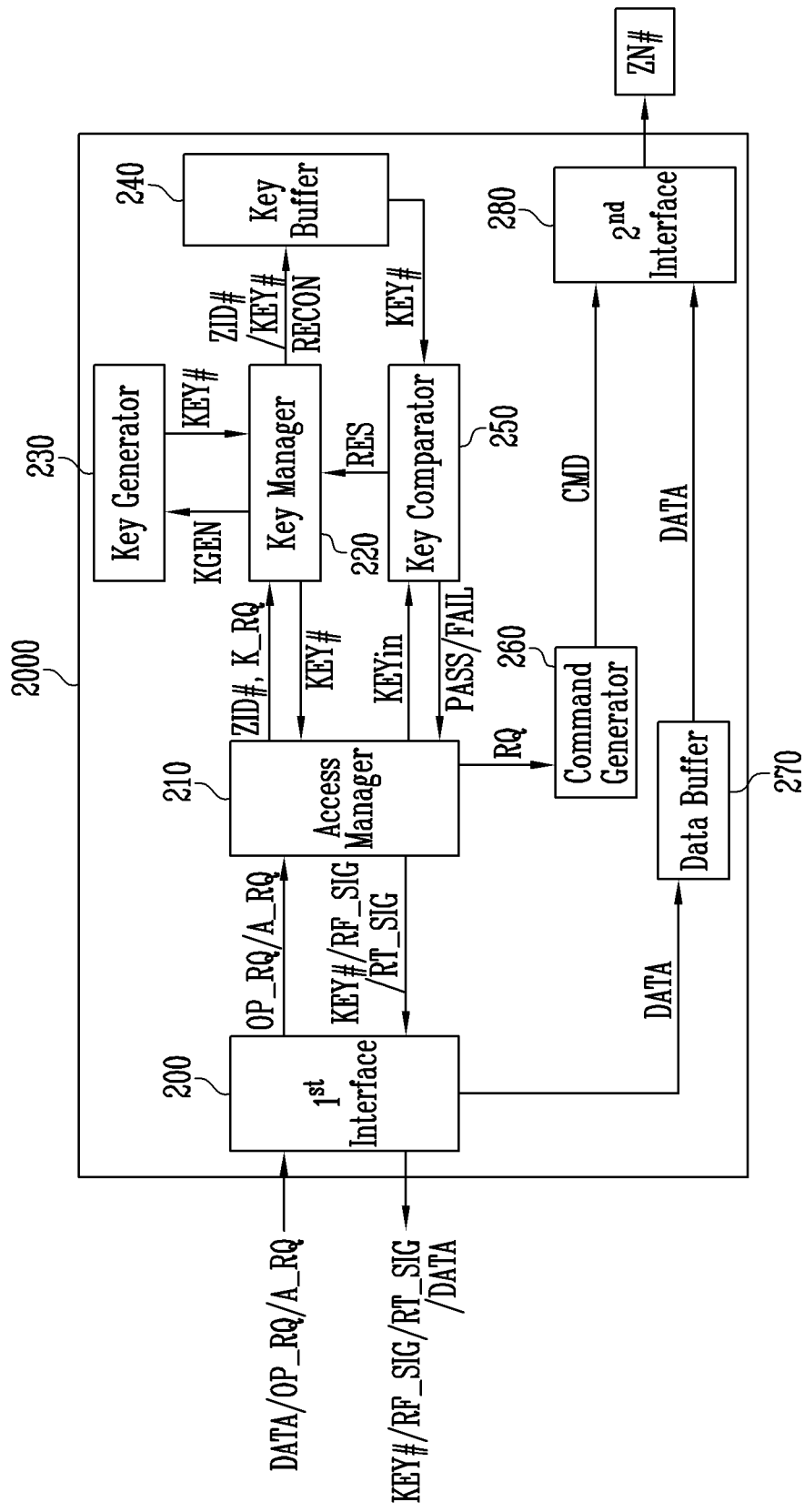
FIG. 7 is a diagram illustrating a controller according to an embodiment of the present disclosure.

FIG. 7 is a diagram illustrating a controller 2000 according to an embodiment of the present disclosure.

Referring to FIG. 7, the controller 2000 may include a first interface 200, an access manager 210, a key manager 220, a key generator 230, a key buffer 240, a key comparator 250, a command generator 260, a data buffer 270, and a second interface 280.

The first interface 200 may input and output requests, data, and signals between the hosts and the controller 2000. For example, when the first interface 200 receives an access request A_RQ, an operation request OP_RQ, or data DATA output from the hosts, the first interface 200 may transfer the access request A_RQ or the operation request OP_RQ to the access manager 210. When the first interface 200 receives a key KEY #, a refuse signal RF_SIG, or a retransmission signal RT_SIG from the access manager 210, the first interface 200 may transfer the key KEY #, the refuse signal RF_SIG, or the retransmission signal RT_SIG to the selected host. In addition, the first interface 200 may transfer the data DATA between the hosts and the data buffer 270. The access request A_RQ may be a request for the hosts to receive an access permission from the memory system, and may be output before outputting the operation request OP_RQ. The operation request OP_RQ may be output when the program, read or erase operation is requested, and may be output from a host having the key KEY #. The key KEY # may be a code generated by the controller 2000 to allow access of the selected host when the access requests A_RQ are received from the plurality of hosts. The refuse signal RF_SIG may be a signal output from the controller 2000 to the unselected hosts when the plurality of hosts output the access requests A_RQ. The retransmission signal RT_SIG may be a signal output from the controller 2000 to the selected host when an input key KEYin in the operation request OP_RQ output from the selected host and the key KEY # stored in the controller 2000 are different.

The access manager 210 may select the access request A_RQ first input among the plurality of access requests and output a key request K_RQ for generating the key KEY #. The access manager 210 may output the refuse signal RF_SIG to the first interface 200 to inform the unselected hosts that the access is refused. The access manager 210 may transfer the received key KEY # to the first interface 200 when receiving the key KEY # from the key manager 220 after outputting the key request K_RQ. When the operation request OP_RQ is input, the access manager 210 may extract the input key KEYin in the operation request OP_RQ and transfer the input key KEYin to the key comparator 250. When a pass signal PASS is input, the access manager 210 may extract a request RQ in the operation request OP_RQ and transfer the extracted request RQ to the command generator 260. When a fail signal FAIL is input, the access manager 210 may determine that the input key KEYin output from the selected host is different from the key KEY # stored in the controller 2000, and output the retransmission signal RT_SIG.

The key manager 220 may output a key generation signal KGEN to the key generator 230 in response to the key request K_RQ. Further, the key manager 220 may receive the key KEY # generated by the key generator 230. When the key KEY # is input, the key manager 220 may transmit the key KEY # to each of the key buffer 240 and the access manager 210. When transmitting the key KEY # to the key buffer 240, the key manager 220 may also transmit a zone ID ZID #. In addition, when a reset signal RES is input from the key comparator 250, the key manager 220 may output the zone ID ZID # and a reset control signal RECON to delete the key KEY # corresponding to the selected zone ID ZID # in the key buffer 240.

The key generator 230 may generate the key KEY # in response to the key generation signal KGEN. For example, the key generator 230 may include a key table in which various keys KEY # are stored, and may be configured to output a randomly selected key KEY # in response to the key generation signal KGEN. Alternatively, the key generator 230 may be configured to generate a code formed of a plurality of bits in response to the key generation signal KGEN, and output the generated code as the key KEY #.

The key buffer 240 may be configured to store the key KEY # allocated for each zone. For example, the key buffer 240 may include a volatile or nonvolatile memory, and may store the key KEY # corresponding to each of the plurality of zones. In addition, the key buffer 240 may delete the key KEY # corresponding to the zone ID ZID # in response to the zone ID ZID # and the reset control signal RECON.

When the input key KEYin is received, the key comparator 250 may receive the key KEY # from the key buffer 240 and compare the input key KEYin with the received key KEY #. When the input key KEYin is the same as the received key KEY #, the key comparator 250 may determine the host that outputs the operation request OP_RQ as the host permitted to access from the controller 2000, and output the pass signal PASS. When the input key KEYin is different from the received key KEY #, the key comparator 250 may determine the host that outputs the operation request OP_RQ as the host that is not permitted to access from the controller 2000, and output a fail signal FAIL.

The command generator 260 may generate a program, read, or erase command CMD in response to the request RQ from the access manager 210 and output the generated command CMD.

The data buffer 270 may be configured to temporarily store the data DATA output from the first interface 200. For example, the data buffer 270 may be configured as a volatile or nonvolatile memory. The data buffer 270 may transmit the data DATA to the second interface 280 when the command CMD is output from the command generator 260.

The second interface 280 may receive the command CMD from the command generator 260 and the data DATA from the data buffer 270, and transmit the command CMD and the data DATA to the selected zone ZN #.

Among the above-described devices, detailed configuration and operation of main devices are described as follows.

Figure 8:
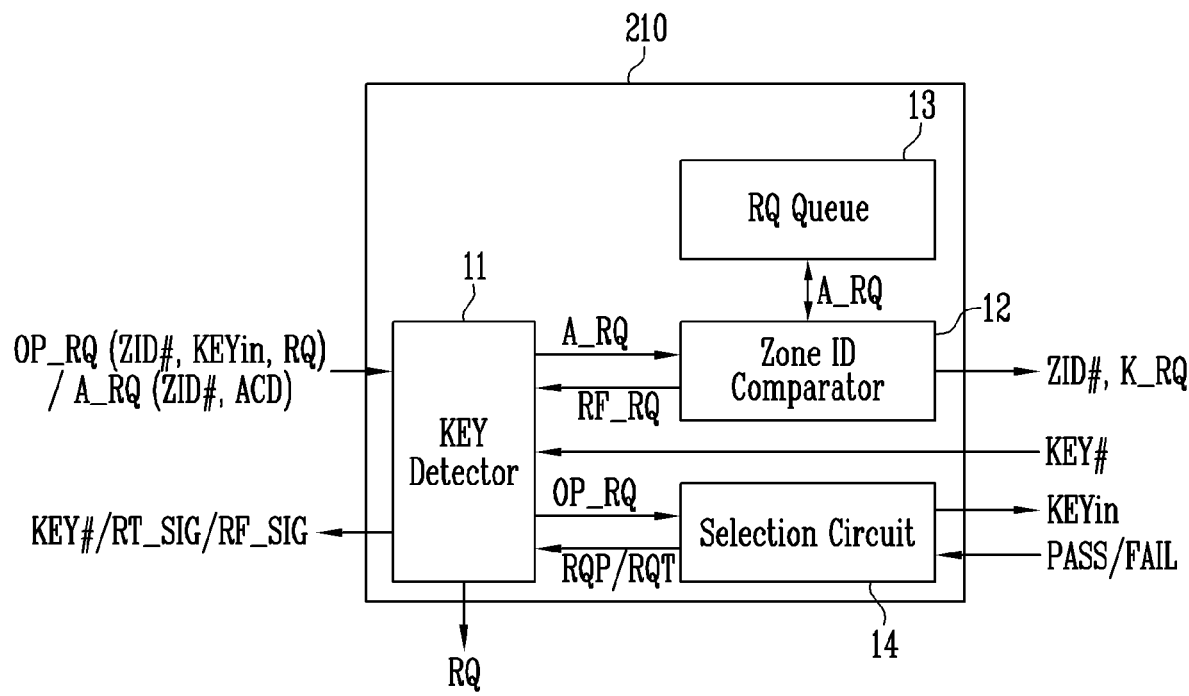
FIG. 8 is a diagram illustrating an access manager according to an embodiment of the present disclosure.

FIG. 8 is a diagram illustrating an access manager 210 according to an embodiment of the present disclosure.

Referring to FIG. 8, the access manager 210 may include a key detector 11, a zone ID comparator 12, a request (RQ) queue 13, and a selection circuit 14.

The key detector 11 may distinguish (or detect) between the access requests A_RQ or the operation request OP_RQ output from the hosts, and extract necessary information among various pieces of information in the access request A_RQ or the operation request OP_RQ. For example, the access request A_RQ may include a zone ID ZID # and an access code ACD. The access code ACD indicates that the host requests access to the memory system, and the zone ID ZID # indicates an address corresponding to a zone for programming data. The operation request OP_RQ may include the request RQ, the input key KEYin, and the zone ID ZID #. The request RQ may be information for distinguishing the program, read, or erase operation. The input key KEYin may be the key KEY # transmitted by the host. Here, the input key KEYin is normally formed of the same code as the key KEY # transmitted by the controller 2000 to the selected host, but may be used to determine a case where an error occurs in a process in which the key KEY # is transmitted or another host other than the selected host outputs the operation request OP_RQ. The key detector 11 may transmit the access requests A_RQ to the zone ID comparator 12 and transmit the operation request OP_RQ to the selection circuit 14.

The zone ID comparator 12 may compare the zone IDs ZID # in each of the access requests A_RQ with each other. For example, when the zone IDs ZID # in the different access requests A_RQ are the same, the zone ID comparator 12 may determine that a plurality of hosts request access to the same zone and select first input access request A_RQ among the access requests A_RQ. Subsequently, the zone ID comparator 12 may output the zone ID ZID # and the key request K_RQ in the selected access request A_RQ, and output a refuse request RF_RQ for unselected access requests A_RQ to the key detector 11. When the refuse request RF_RQ is received, the key detector 11 may output the refuse signal RF_SIG to the hosts of which access is rejected.

When the key KEY # for the selected access request A_RQ is input, the key detector 11 may output the input key KEY #. The key KEY # output from the key detector 11 may be transmitted to the selected host.

When the zone IDs ZID # in the different access requests A_RQ are different from each other, the zone ID comparator 12 may determine that the plurality of hosts request access to different zones, select the first input access request A_RQ among the access requests A_RQ, and transmit the remaining access requests A_RQ to the request queue 13. The zone ID comparator 12 may output the zone ID ZID # and the key request K_RQ in the selected access request A_RQ. When the access requests A_RQ are input, the request queue 13 may sequentially queue the access requests. When a previous access request A_RQ is completed, the request queue 13 may transmit an access request A_RQ queued in a next order to the zone ID comparator 12.

When the operation request OP_RQ is input, the selection circuit 14 may detect and select the input key KEYin in the operation request OP_RQ and output the detected input key KEYin. In addition, the selection circuit 14 may output, to the key detector 11, a request pass signal RQP in response to the pass signal PASS, and output a request transmission signal RQT in response to the fail signal FAIL.

The key detector 11 may extract the request RQ in the operation request OP_RQ in response to the request pass signal RQP and transmit the request RQ to the command generator 260 of FIG. 7. The key detector 11 may transmit the request retransmission signal RT_SIG to the first interface 200 of FIG. 7 in response to the request transmission signal RQT.

Figure 9:
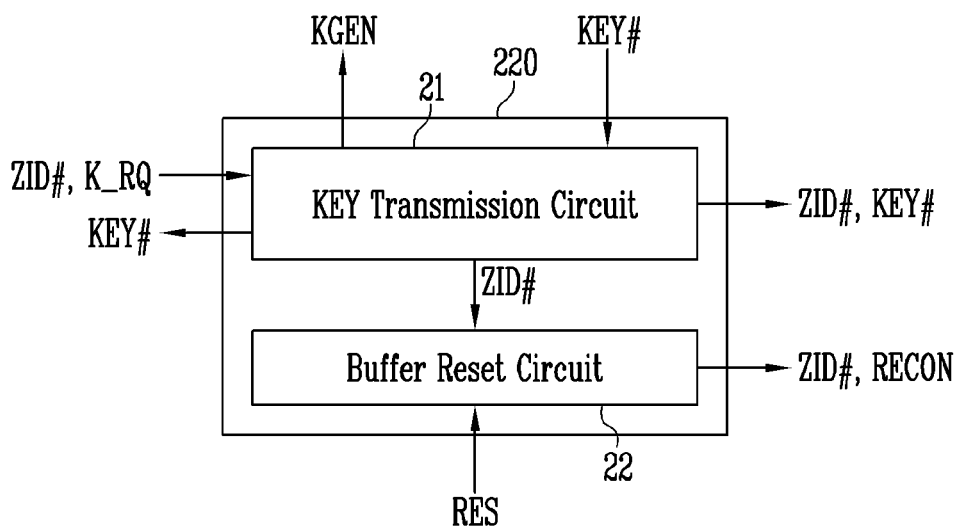
FIG. 9 is a diagram illustrating a key manager according to an embodiment of the present disclosure.

FIG. 9 is a diagram illustrating a key manager 220 according to an embodiment of the present disclosure.

Referring to FIG. 9, the key manager 220 may include a key transmission circuit 21 and a buffer reset circuit 22.

The key transmission circuit 21 may output the key generation signal KGEN in response to the zone ID ZID # and the key request K_RQ, and receive the key KEY # generated by the key generator 230 of FIG. 7. When the key KEY # is received, the key transmission circuit 21 may transmit the zone ID ZID # and the key KEY # to the key buffer 240 of FIG. 7.

When the reset signal RES is input, the buffer reset circuit 22 may receive the zone ID ZID # from the key transmission circuit 21 and output the reset control signal RECON together with the received zone ID ZID #, to delete the key KEY # corresponding to the selected zone ID ZID # in the key buffer 240 of FIG. 7. The key buffer 240 of FIG. 7 may delete the key KEY # corresponding to the zone ID ZID # in response to the reset control signal RECON.

Figure 10:
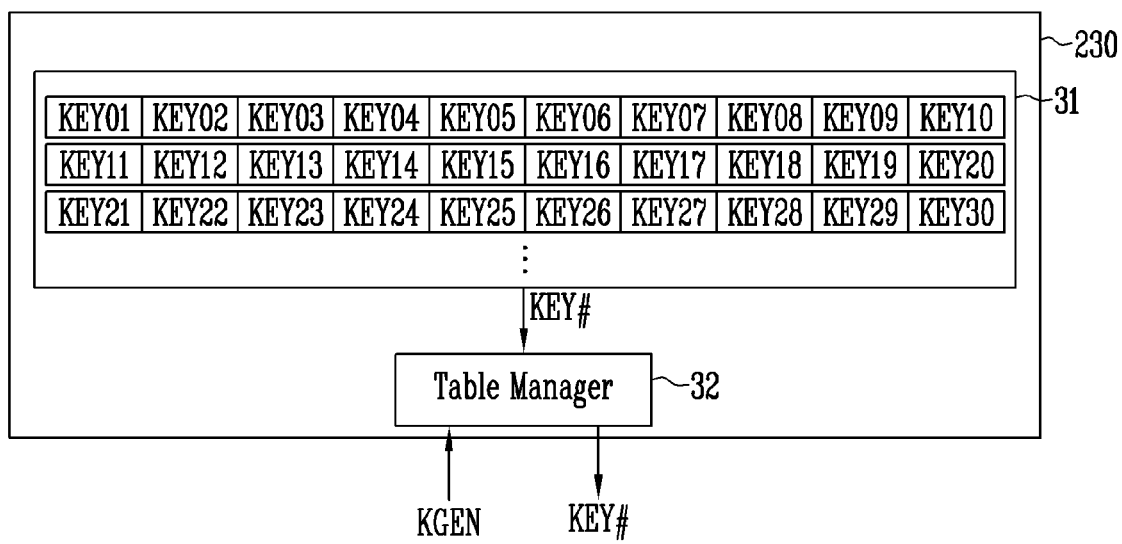
FIG. 10 is a diagram illustrating a key generator according to an embodiment of the present disclosure.

FIG. 10 is a diagram illustrating a key generator 230 according to an embodiment of the present disclosure.

Referring to FIG. 10, the key generator 230 may include a key table 31 and a table manager 32.

The key table 31 may store various different keys including KEY01 to KEY30, and output, to the table manager 32, the key KEY # selected under control of the table manager 32.

The table manager 32 may select any one key KEY # from the key table 31 in response to the key generation signal KGEN and output the selected key KEY #. The table manager 32 may monitor the key KEY # being used in the key table 31. When the key generation signal KGEN is input, the table manager 32 may select and output the key KEY # that is not currently being used.

Figure 11A:
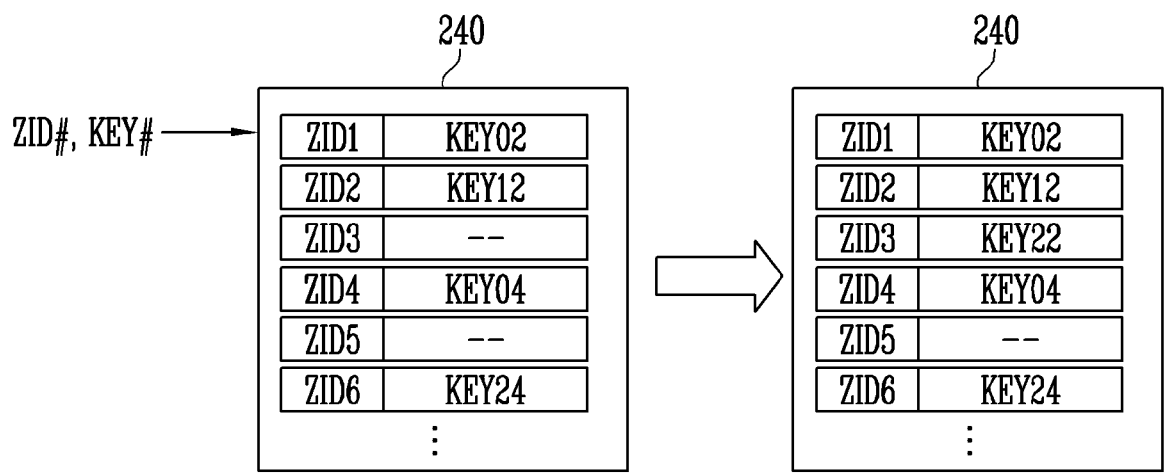
FIGS. 11A and 11B are diagrams illustrating a key buffer according to an embodiment of the present disclosure.
Figure 11B:
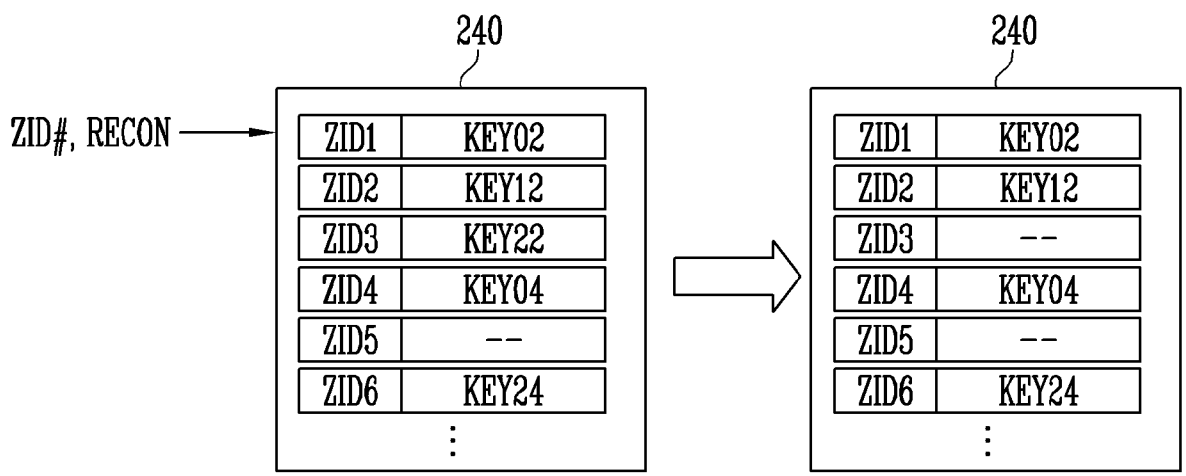

FIGS. 11A and 11B are diagrams illustrating a key buffer 240 according to an embodiment of the present disclosure. FIG. 11A is a diagram illustrating a method of storing the key KEY #, and FIG. 11B is a diagram illustrating a method of resetting the memory area of the selected zone ID ZID #.

Referring to FIG. 11A, when the zone ID ZID # and the key KEY # are input, the key buffer 240 may store the key KEY # in the memory area corresponding to the zone ID ZID #. For example, when the zone ID ZID # is 3 and the key KEY # is 22, the key buffer 240 may store a key value KEY22 of 22 in the memory area corresponding to an index ZID3 of which the zone ID ZID # is 3. The key KEY # stored in the key buffer 240 may be output when requested by the key comparator 250 of FIG. 7.

Referring to FIG. 11B, the key buffer 240 may reset the memory area corresponding to the zone ID ZID # in response to the zone ID ZID # and the reset control signal RECON. For example, when the zone ID ZID # is 3, in response to the reset control signal RECON, the key buffer 240 may delete the key value KEY22 stored in the memory area corresponding to the index ZID3 of which the zone ID ZID # is 3.

Figure 12:
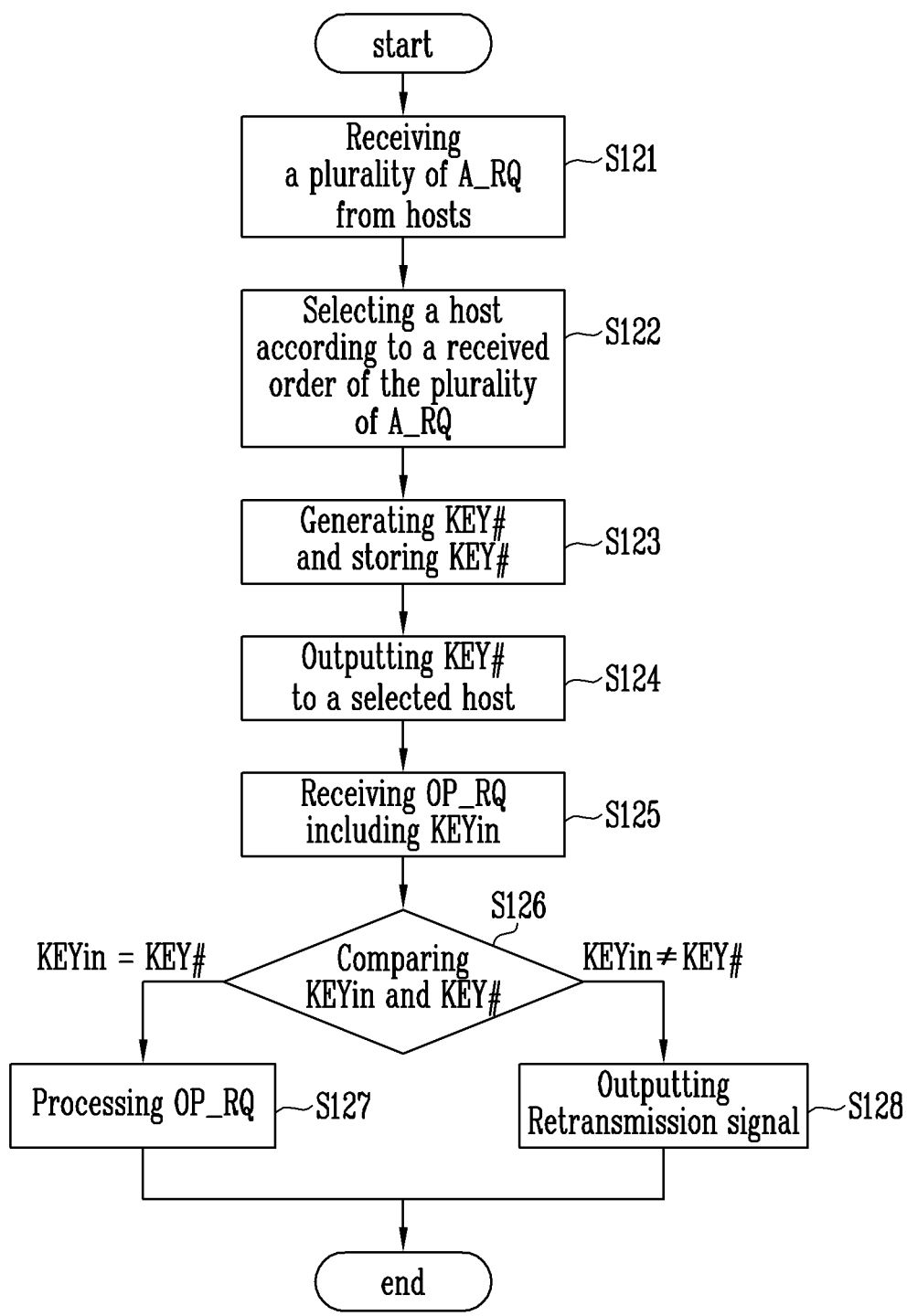
FIG. 12 is a diagram illustrating an operation method of a controller according to an embodiment of the present disclosure.

FIG. 12 is a diagram illustrating an operation method of a controller (e.g., a controller 2000 of FIG. 7) according to an embodiment of the present disclosure.

Referring to FIG. 12, the controller may receive the plurality of access requests A_RQ for the program operation from the plurality of hosts (S121). That is, the plurality of hosts may output the access requests A_RQ to access the selected zone of the memory system before outputting the operation request for executing the program operation.

The controller may select the host according to the order in which the plurality of access requests A_RQ are received (S122). For example, the controller may select the first received access request A_RQ among the received access requests A_RQ. Therefore, the host that outputs the selected access request A_RQ may be selected as the host permitted to access, and the remaining hosts may be refused to access.

The controller may generate the key KEY # to be transmitted to the selected host (S123). The key KEY # may be generated as a code formed of a plurality of bits, and may be used to identify the host permitted to access. Further, the controller may store the key KEY # in the key buffer.

The controller may output the key KEY # to the selected host (S124).

The selected host may include the received key KEY # in the operation request OP_RQ and output the operation request OP_RQ. The key KEY # in the operation request OP_RQ is defined as the input key KEYin to distinguish between the key KEY # in the operation request OP_RQ and the key KEY # stored in the controller.

When the controller receives the operation request OP_RQ including the input key KEYin (S125), the controller may compare the key KEY # stored in the controller with the received input key KEYin (S126).

When the input key KEYin is the same as the key KEY #, the controller may execute the operation request OP_RQ requested by the selected host (S127). When the input key KEYin is different from the key KEY #, the controller may output the retransmission signal to the selected host (S128).

As described above, when the plurality of hosts transmit the access requests to the controller in order to program data in the same area among the memory zones of the memory system, the controller may select the earliest received access request and transmit the key KEY # that allows access to the host outputting a corresponding access request. Therefore, since the unselected hosts may attempt to access another zone of the memory system or access a corresponding zone again at a different time, the access between the host and the memory system may be efficiently managed.

The operation method of each device of the controller is sequentially described according to a flowchart shown in FIG. 12 as follows.

FIGS. 13 to 16B are diagrams illustrating an operation method of each configuration included in a controller of the present disclosure.

Figure 13:
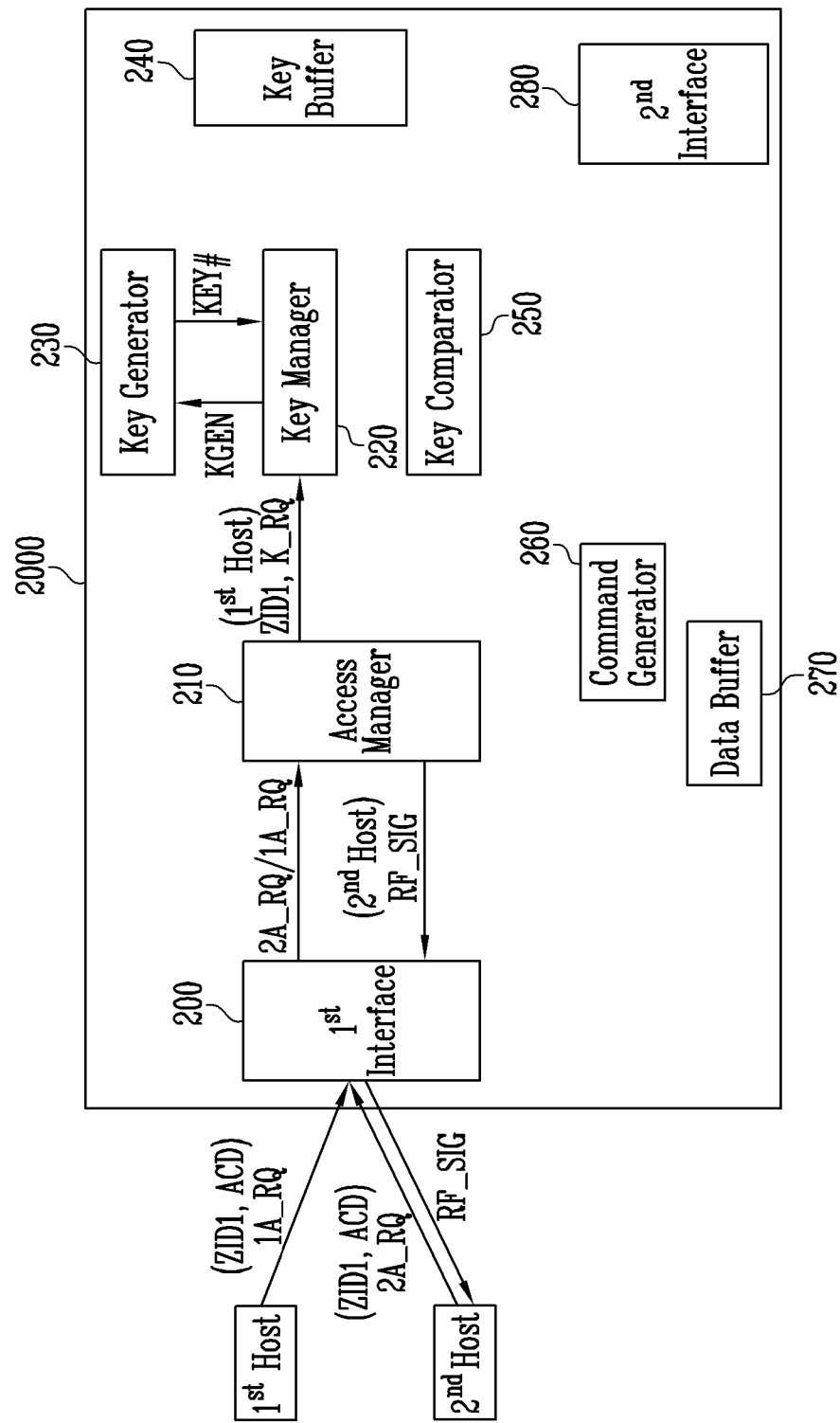
FIGS. 13 to 16B are diagrams illustrating an operation method of each configuration included in a controller of the present disclosure.

Referring to FIG. 13, a first host may transmit a first access request 1A_RQ to the controller 2000, and a second host may transmit a second access request 2A_RQ to the controller 2000. The first access request 1A_RQ may include an access code ACD and a first zone ID ZID1, and the second access request 2A_RQ may include the access code ACD and the first zone ID ZID1.

When the first and second access requests 1A_RQ and 2A_RQ are input, the first interface 200 of the controller 2000 may transmit the first and second access requests 1A_RQ and 2A_RQ to the access manager 210 in the order in which the first and second access requests 1A_RQ and 2A_RQ are input.

When the plurality of access requests, such as the first and second access requests 1A_RQ and 2A_RQ, are input, the access manager 210 may select the first input access request 1A_RQ. For example, assuming that the first access request 1A_RQ is input before the second access request 2A_RQ, the access manager 210 may select the first access request 1A_RQ to permit the first access request 1A_RQ, and generate the refuse signal RF_SIG for rejecting the second access request 2A_RQ. The refuse signal RF_SIG may be transmitted to the first interface 200, and the first interface 200 may transmit the refuse signal RF_SIG to the second host. In an embodiment, when the refuse signal RF_SIG is received, the second host may process the operation request transmitted to the controller 2000 as a fail. In an embodiment, when the refuse signal RF_SIG is received, the second host may process the operation request transmitted to the controller 2000 as a pass, and may invalidate the received key KEY # even though the key KEY # is received from the controller 2000.

The access manager 210 may extract the first zone ID ZID1 in the first access request 1A_RQ and transmit the key request K_RQ and the first zone ID ZID1 to the key manager 220. The key manager 220 may transmit the key generation signal KGEN to the key generator 230 in response to the key request K_RQ.

The key generator 230 may generate the key KEY # in response to the key generation signal KGEN, and transmit the generated key KEY # to the key manager 220.

Figure 14:
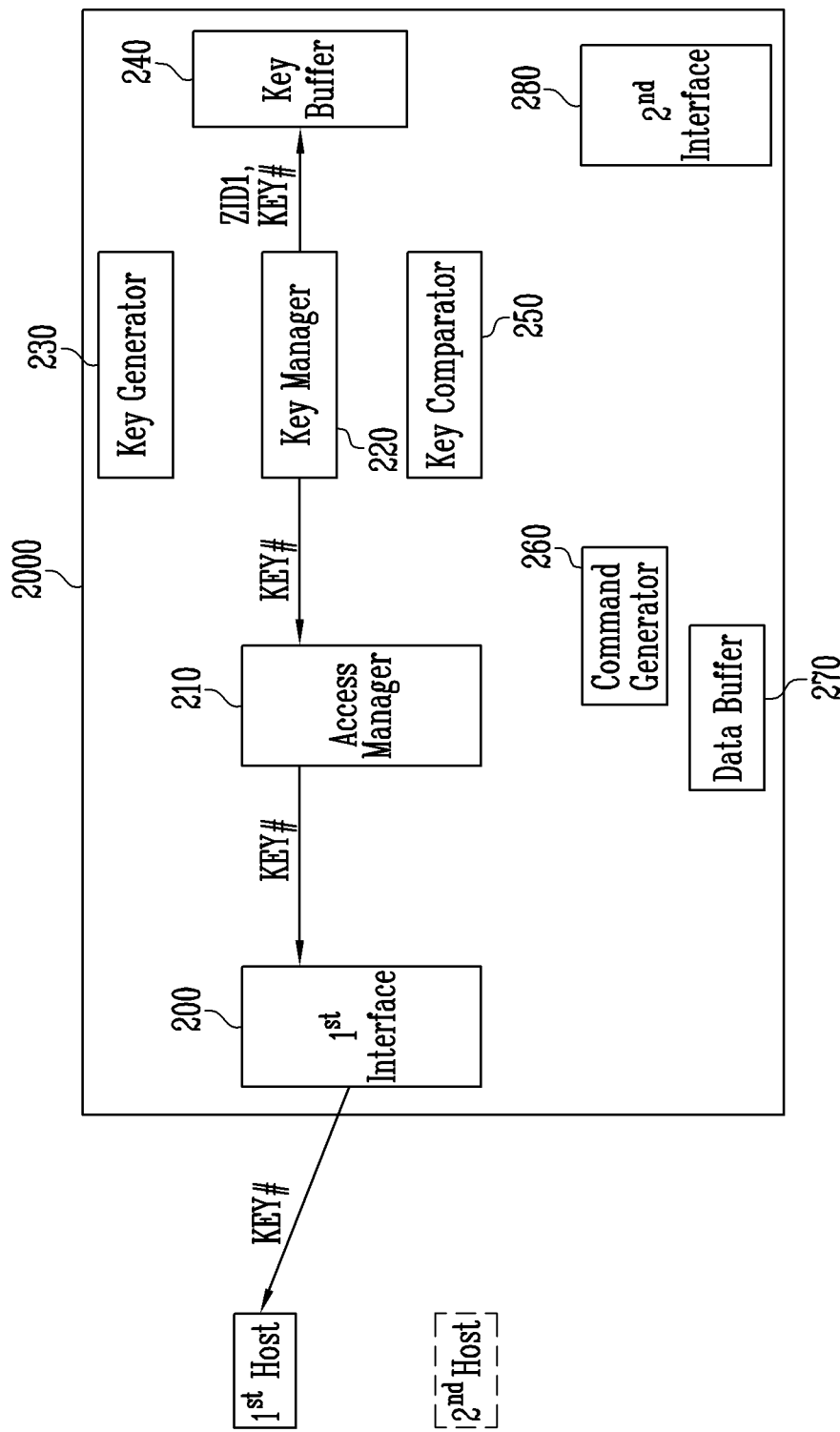

Referring to FIG. 14, the key manager 220 may transmit the key KEY # received from the key generator 230 and the first zone ID ZID1 to the key buffer 240, and transmit the key KEY # to the access manager 210.

The key buffer 240 may store the key KEY # in a memory area corresponding to the first zone ID ZID1 received from the key manager 220. The access manager 210 may transmit the received key KEY # to the first interface 200, and the first interface 200 may transmit the received key KEY # to the first host.

Figure 15:
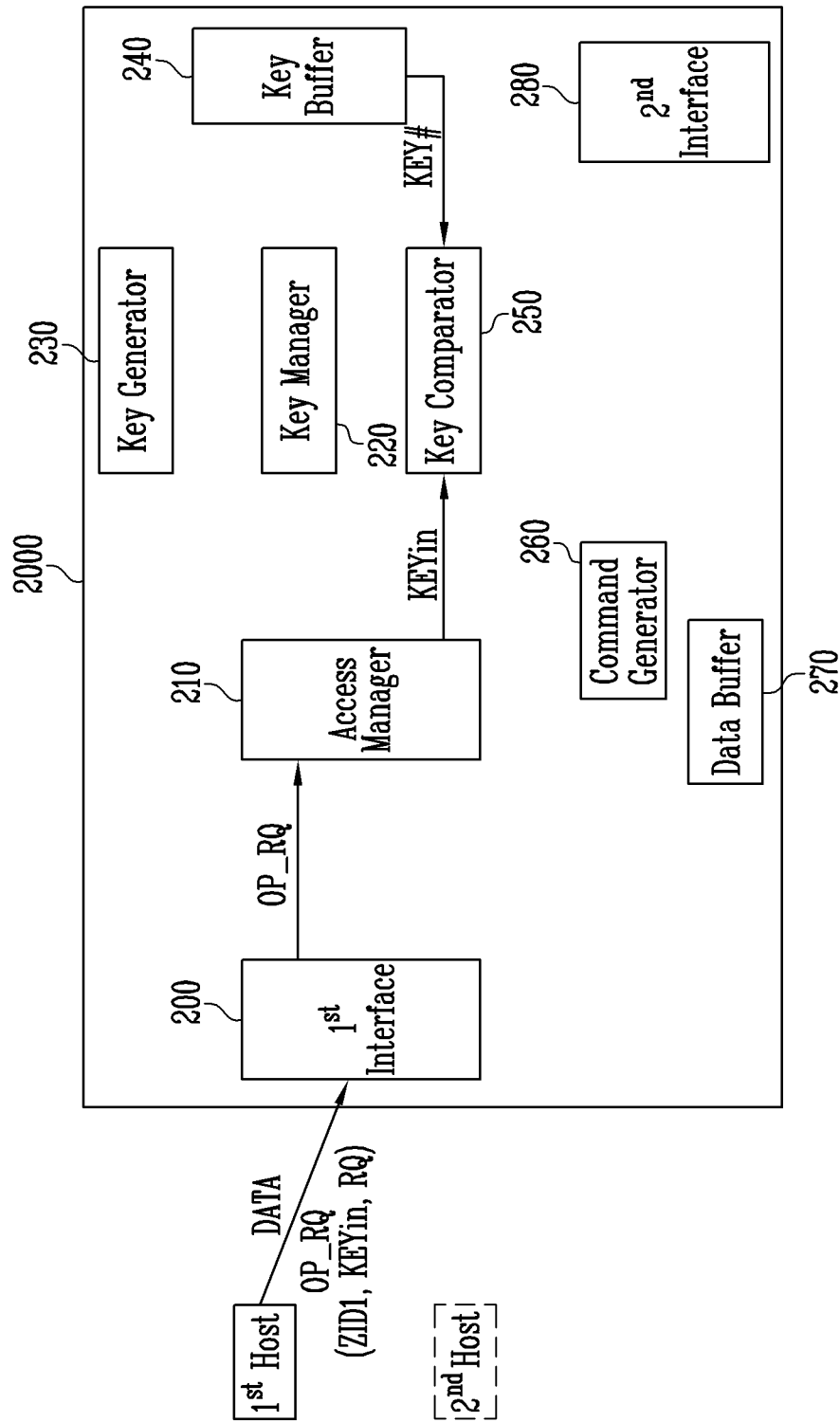

Referring to FIG. 15, the first host may include the key KEY # received from the controller 2000 in the operation request OP_RQ. The key KEY # in the operation request OP_RQ is defined as the input key KEYin to be distinguished from the key KEY # stored in the controller 2000. Accordingly, the operation request OP_RQ may include the request RQ, the input key KEYin, and the first zone ID ZID1. The first host may transmit data DATA to be programmed and the operation request OP_RQ to the first interface 200.

The first interface 200 may transmit the operation request OP_RQ to the access manager 210. The access manager 210 may extract the input key KEYin in the operation request OP_RQ and transmit the extracted input key KEYin to the key comparator 250. When the input key KEYin is received, the key comparator 250 may receive the key KEY # corresponding to the first zone ID ZID1 from the key buffer 240. Subsequently, the key comparator 250 may determine whether the input key KEYin is the same as the key KEY #.

Figure 16A:
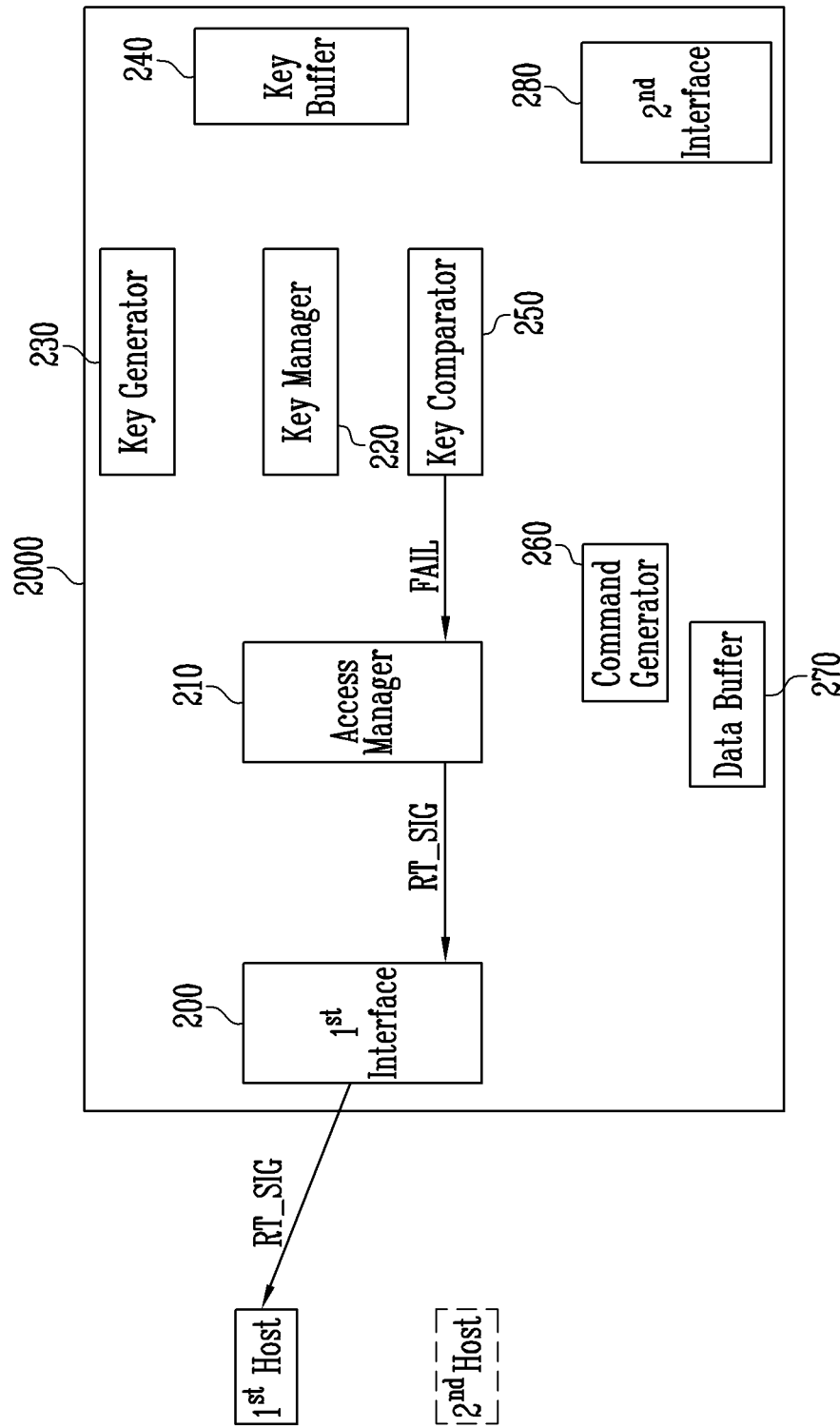
Figure 16B:
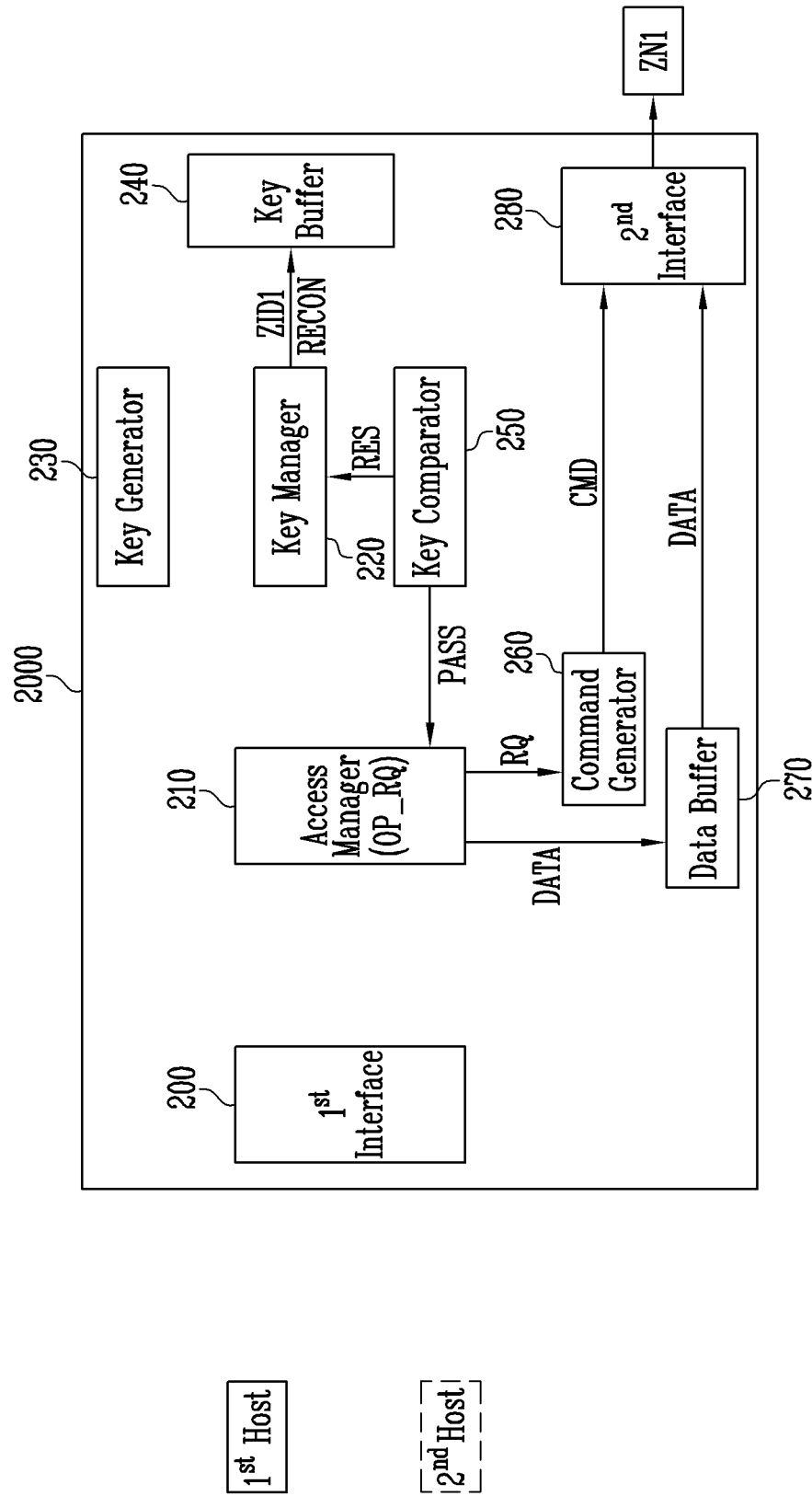

FIGS. 16A and 16B are diagrams illustrating a subsequent operation performed according to a determination result of the key comparator 250. FIG. 16A is a diagram illustrating an operation when the input key KEYin is different from the key KEY #, and FIG. 16B is a diagram illustrating the operation when the input key KEYin is the same as the key KEY #.

Referring to FIG. 16A, when the input key KEYin is different from the key KEY #, the key comparator 250 may output the fail signal FAIL to the access manager 210, and the access manager 210 may output, to the first interface 200, the retransmission signal RT_SIG in response to the fail signal FAIL. The first interface 200 may transmit the retransmission signal RT_SIG output from the access manager 210 to the first host. That is, a case where the input key KEYin transmitted from the first host is different from the key KEY # stored in the controller 2000 may indicate that the first host is a host of which access is not permitted, or an error may occur in a process in which the key KEY # is transmitted to the first host. Therefore, the controller 2000 may transmit the retransmission signal RT_SIG to the first host to confirm again whether the first host is the host of which the access is permitted.

The first host may output the operation request OP_RQ of FIG. 15 again in response to the retransmission signal RT_SIG. When the number of times it is determined that the input key KEYin output from the first host is different from the key KEY # stored in the controller 2000 reaches a threshold number of times, the first host may output the first access request 1A_RQ of FIG. 13 to the controller 2000 again.

Referring to FIG. 16B, when the input key KEYin is the same as the key KEY #, the key comparator 250 may output the pass signal PASS to the access manager 210, and the kay comparator 250 may output, to the key manager 220, the reset signal RES. The key manager 220 may output, to the key buffer 240, the first zone ID ZID1 and the reset control signal RECON in response to the reset signal RES. The key buffer 240 may reset the memory area corresponding to the first zone ID ZID1 in response to the first zone ID ZID1 and the reset control signal RECON.

The access manager 210 may transmit the request RQ in the operation request OP_RQ to the command generator 260 in response to the pass signal PASS, and transmit the data DATA to the data buffer 270. For example, the request RQ may be a request for the program operation, and the data DATA may be data to be programmed.

The data buffer 270 may transmit the data DATA received from the access manager 210 to the second interface 280. The command generator 260 may generate the command CMD in response to the request RQ. For example, when the request RQ for the program operation is received, the command generator 260 may generate the command CMD for performing the program operation. The command CMD generated by the command generator 260 may be transmitted to the second interface 280.

The second interface 280 may transmit the received command CMD and data DATA to the memory device including the first zone ZN1.

Figure 17:
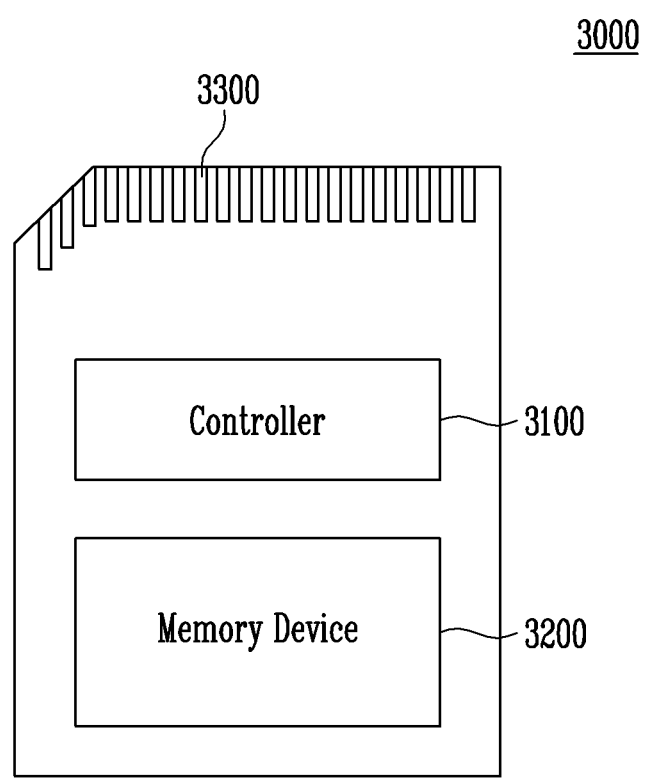
FIG. 17 is a diagram illustrating a memory card system to which a controller of the present disclosure is applied.

FIG. 17 is a diagram illustrating a memory card system 3000 to which a controller of the present disclosure is applied.

Referring to FIG. 17, the memory card system 3000 includes a controller 3100, a memory device 3200, and a connector 3300.

The controller 3100 is connected to the memory device 3200. The controller 3100 is configured to access the memory device 3200. For example, the controller 3100 may be configured to control a program, read, or erase operation of the memory device 3200 or a background operation. The controller 3100 may be configured identically to the controller 2000 shown in FIG. 7. The controller 3100 is configured to provide an interface between the memory device 3200 and a host. The controller 3100 is configured to drive firmware for controlling the memory device 3200. The controller 3100 may be implemented identically to the controller 2000 described with reference to FIG. 7.

For example, the controller 3100 may include components such as a random access memory (RAM), a processing unit, a host interface, a memory interface, and an error correction circuit.

The controller 3100 may communicate with an external device through the connector 3300. The controller 3100 may communicate with the external device (for example, the host) according to a specific communication standard. For example, the controller 3100 is configured to communicate with the external device through at least one of various communication standards such as a universal serial bus (USB), a multimedia card (MMC), an embedded MMC (eMMC), peripheral component interconnection (PCI), PCI-express (PCI-e or PCIe), advanced technology attachment (ATA), serial-ATA, parallel-ATA, a small computer system interface (SCSI), an enhanced small disk interface (ESDI), integrated drive electronics (IDE), firewire, a universal flash storage (UFS), WiFi, Bluetooth, and NVMe. For example, the connector 3300 may be defined by at least one of the various communication standards described above.

For example, the memory device 3200 may be configured of various non-volatile memory devices such as an electrically erasable and programmable ROM (EEPROM), a NAND flash memory, a NOR flash memory, a phase-change RAM (PRAM), a resistive RAM (ReRAM), ferroelectric RAM (FRAM), and a spin transfer torque-magnetic RAM (STT-MRAM).

The controller 3100 and the memory device 3200 may be integrated into one semiconductor device to configure a memory card. For example, the controller 3100 and the memory device 3200 may be integrated into one semiconductor device to configure a memory card such as a PC card (personal computer memory card international association (PCMCIA)), a compact flash card (CF), a smart media card (e.g., SM or SMC), a memory stick, a multimedia card (e.g., MMC, RS-MMC, MMCmicro, or eMMC), a secure digital (SD) card (e.g., SD, miniSD, microSD, or SDHC), and a universal flash storage (UFS).

Figure 18:
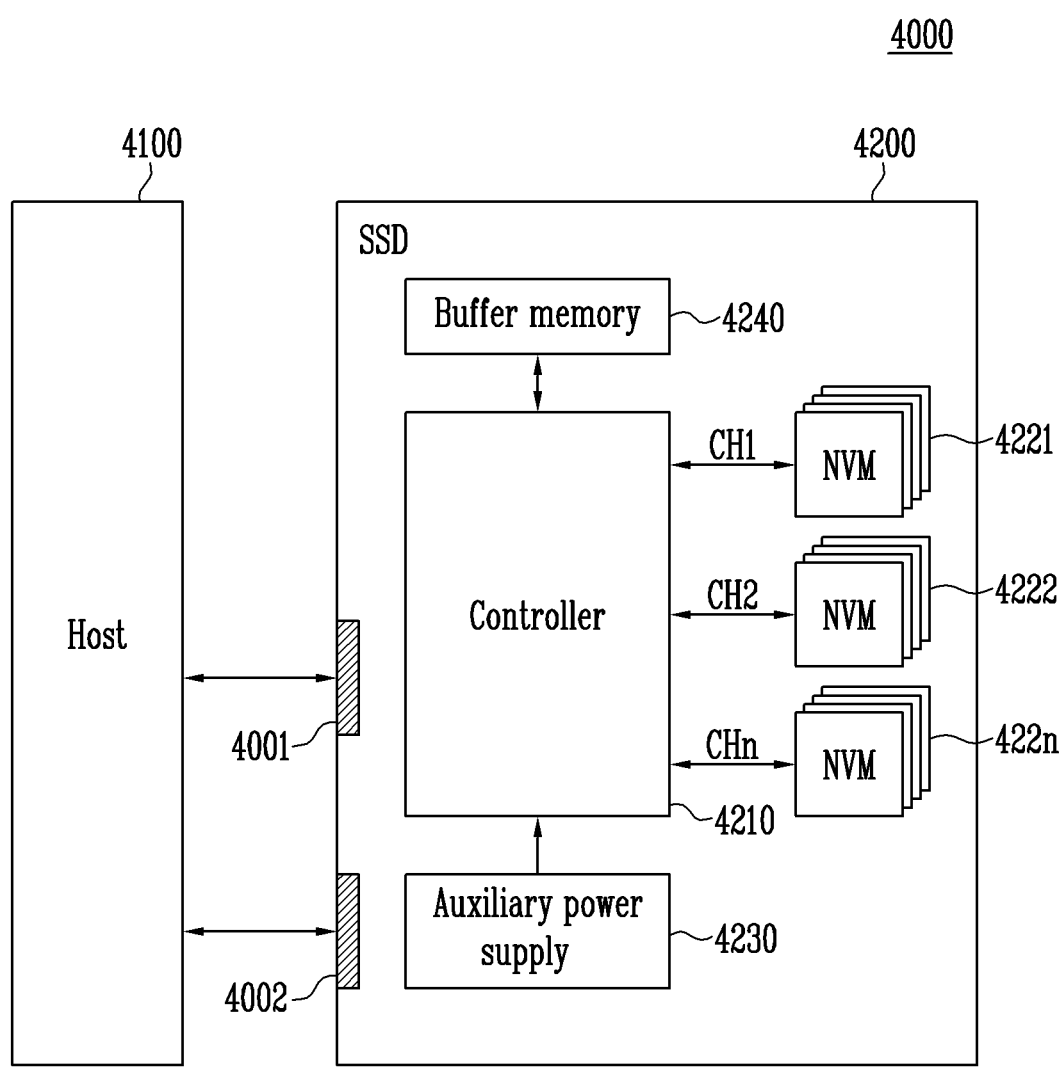
FIG. 18 is a diagram illustrating a solid state drive (SSD) system to which a controller of the present disclosure is applied.

FIG. 18 is a diagram illustrating a solid state drive (SSD) system 4000 to which a controller of the present disclosure is applied.

Referring to FIG. 18, the SSD system 4000 includes a host 4100 and an SSD 4200. The SSD 4200 exchanges a signal SIG with the host 4100 through a signal connector 4001 and receives power PWR through a power connector 4002. The SSD 4200 includes a controller 4210, a plurality of flash memories 4221 to 422n, an auxiliary power supply 4230, and a buffer memory 4240.

According to an embodiment of the present disclosure, the controller 4210 may perform a function of the controller 2000 described with reference to FIG. 7.

The controller 4210 may control the plurality of flash memories 4221 to 422n in response to a signal received from the host 4100. For example, the signal may be signals based on an interface between the host 4100 and the SSD 4200. For example, the signal may be a signal defined by at least one of interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), firewire, a universal flash storage (UFS), WiFi, Bluetooth, and an NVMe.

The auxiliary power supply 4230 is connected to the host 4100 through the power connector 4002. The auxiliary power supply 4230 may receive a power voltage from the host 4100 and charge the power voltage. When power supply from the host 4100 is not smooth, the auxiliary power supply 4230 may provide the power voltage of the SSD 4200. For example, the auxiliary power supply 4230 may be positioned in the SSD 4200 or outside the SSD 4200. For example, the auxiliary power supply 4230 may be positioned on a main board and may provide auxiliary power to the SSD 4200.

The buffer memory 4240 operates as a buffer memory of the SSD 4200. For example, the buffer memory 4240 may temporarily store data received from the host 4100 or data received from the plurality of flash memories 4221 to 422n, or may temporarily store meta data (for example, a mapping table) of the flash memories 4221 to 422n. The buffer memory 4240 may include a volatile memory such as a DRAM, an SDRAM, a DDR SDRAM, and an LPDDR SDRAM, or nonvolatile memories such as an FRAM, a ReRAM, an STT-MRAM, and a PRAM.

What is claimed is:
1. An electronic system comprising:
a memory device including a plurality of zones, each zone capable of storing data;
a plurality of hosts configured to output access requests for accessing a selected zone, among the plurality of zones; and
a controller configured to select, when the access requests are received from the plurality of hosts, one host that outputs an access request, which is first received among the access requests, among the plurality of hosts, output reject signals to unselected hosts excluding the selected host among the plurality of hosts, generate and store a key for confirming the selected host, and transmit the key to the selected host,
wherein the selected host transmits an operation request including the key to the controller, and
the controller executes the operation request when the key is included in the operation request received from the selected host.
2. The electronic system of claim 1, wherein the memory device includes a plurality of memory blocks, and each of the plurality of zones includes some memory blocks among the plurality of memory blocks.

3. The electronic system of claim 1, wherein each of the access requests includes a zone identifier (ID) and an access code corresponding to an address of the selected zone.

4. The electronic system of claim 3, wherein the controller is configured to select one host among the plurality of hosts when zone IDs of the selected zone included in the access requests are the same.

5. The electronic system of claim 1, wherein each of the unselected hosts is configured to process the operation request as a fail when a corresponding refuse signal is received.

6. The electronic system of claim 1, wherein each of the unselected hosts is configured to process the operation request as a pass when a corresponding refuse signal is received, and invalidate the key even though the key is received.

7. The electronic system of claim 1, wherein the key includes a code including a plurality of bits.

8. The electronic system of claim 1, wherein the operation request includes a request for a program operation, the key, and a zone identifier (ID) of the selected zone.

9. The electronic system of claim 1, wherein the controller is configured to delete the key stored therein when executing the operation request.

10. A controller comprising:
   an access manager configured to receive a plurality of access requests for accessing a same zone from a plurality of hosts, select one host that outputs an access request of which an input order is the earliest among the plurality of access requests, among the plurality of hosts, output a reject signal to unselected hosts excluding the selected host among the plurality of hosts, and output, to the selected host, a key for confirming the selected host;
   a key generator configured to store a plurality of keys and to output one of the plurality of keys as the key in response to a key generation signal;
   a key manager configured to transmit the key generation signal to the key generator and transmit the key output from the key generator to the access manager according to a request of the access manager; and
   a key comparator configured to check the key included in an operation request when the selected host outputs the operation request including the key.

11. The controller of claim 10, wherein the access manager is configured to transmit a zone identifier (ID) in each of the access requests and a key request to the key manager when the access requests are received, and transmit the key in the operation request to the key comparator when the operation request is received.

12. The controller of claim 10, wherein the key generator comprises:
   a key table including different keys; and
   a table manager configured to extract the key from the key table in response to the key generation signal and transmit the key to the key manager.

13. The controller of claim 10, further comprising:
   a key buffer configured to store the key transmitted to the selected host.

14. The controller of claim 13, wherein the key buffer is configured to store the key in a memory area of a zone identifier (ID) corresponding to an address of the zone, and transmit the key to the key comparator according to a request of the key comparator.

15. The controller of claim 10, wherein the key comparator is configured to compare the key in the operation request with the key generated by the key generator, output a pass signal when the compared keys are identical to each other, and output a fail signal when the compared keys are different from each other.

16. The controller of claim 15, wherein the access manager is configured to execute the operation request in response to the pass signal, and output a retransmission signal to the selected host to receive the operation request again from the selected host in response to the fail signal.

* * * * *